United States Patent [19]

Payne

[11] Patent Number: 4,552,248
[45] Date of Patent: Nov. 12, 1985

[54] PORTABLE CLIMBING DEVICE

[76] Inventor: Jehugh A. Payne, 271 Berean Ave., Atlanta, Ga. 30316

[21] Appl. No.: 664,512

[22] Filed: Oct. 25, 1984

Related U.S. Application Data

[63] Continuation-in-part of Ser. No. 284,383, Jan. 6, 1982, abandoned.

[51] Int. Cl.⁴ ............................................... E04G 3/10
[52] U.S. Cl. .................................................... 182/142
[58] Field of Search ............... 182/142, 141, 145, 150, 182/133

[56] References Cited

U.S. PATENT DOCUMENTS

| 1,073,293 | 9/1913 | Sideman | 182/142 |
| 2,689,890 | 9/1954 | Green | 182/142 |

FOREIGN PATENT DOCUMENTS

| 545561 | 3/1956 | Belgium | 182/142 |
| 30130 | 9/1956 | Finland | 182/142 |
| 1341538 | 9/1963 | France | 182/142 |
| 1074649 | 7/1967 | United Kingdom | 182/142 |

*Primary Examiner*—Reinaldo P. Machado
*Assistant Examiner*—Alvin Chin-Shue
*Attorney, Agent, or Firm*—Harry I. Leon; V. L. Leon

[57] ABSTRACT

A portable climbing device suited for scaling existing overhead structures such as trees, buildings, clifts and the like. Using his legs, a rider cranks a hoisting winch that is equipped with bicycle-like foot pedals to retract a cable by which the device is suspended. Having a curved frame which extends along a narrow region of space from a point above the rider's seat and downwardly behind it, the device tends to deflect any overhead tree branches which may be in a rider's path as he ascends while simultaneously giving him a virtually unobstructed view. Also shielded by the frame is the cable which is guided across a plurality of rollers mounted on the concave side of the frame. The rollers are so positioned that the cable acts on them to stabilize the frame by resisting forces which tend to stretch it longitudinally when the rider's seat is occupied.

A V-shaped supporting member extends downwardly a sufficient distance from the frame to allow the pedals to be rotated freely while the device is still resting on the ground and to enable a rider to mount and dismount the device while it is in a low, stable position. The device is also equipped with a manually-operated safety brake that automatically engages a drum about which the cable is wound to lock the cable in position when no action is taken. The device can be moved along the cable only when the brake is released, thus providing a mechanism for preventing sudden, unwanted drops and for controlling the rate of an intended descent.

9 Claims, 5 Drawing Figures

PORTABLE CLIMBING DEVICE

CROSS-REFERENCE TO RELATED APPLICATION

This application is a continuation-in-part of my earlier copending application, Ser. No. 284,383, filed Jan. 6, 1982, abandoned, Mar. 1, 1985.

BACKGROUND OF THE INVENTION

This invention relates to the art of providing a portable climbing apparatus for bird watchers, tree surgeons, window washers, high-rise rescuers and the like and has particular relationship to portable facilities enabling a user to set up the apparatus at a site and in a position which he feels is best for his purposes.

Typical prior art apparatus include a chair and a platform connected to a hoist having handles which the user operates to raise himself. A major disadvantage of this approach to hoisting oneself is that the upper body strength required of the user is tremendous and well beyond the strength of an average individual.

Devices having a frame which arches generally upwardly behind a seat member upon which a rider sits to crank foot pedals are also known in the prior art. Among these devices are Snyder's orchard lift disclosed in U.S. Pat. No. 4,174,022 and Mannesmann's workman's seat disclosed in British Pat. No. 1,074,649. In the former, two sets of legs support a socketed bridge on which is rotatably mounted a hemisphere; the upper end of a frame, to which are attached a seat member and a foot-pedal operated winch, slides upwardly and downwardly within a sleeve on the hemisphere as a hoisting cable attached to it is alternately retracted and extended. By so restricting the travel of the frame, Snyder can avoid any interference between the foot pedals and the ground or having the winch, which is positioned lowermost on his frame, become enmeshed in dirt and debris. Mannesmann, on the other hand, offers no structure to keep the foot pedals from coming in contact with the ground. Rather Mannesmann relies on the stability provided by a pair of lateral arms which extend horizontally at the height of a seat member from behind it and forwardly on either side of it so that a would-be user need not rest the device on its lowermost parts, including the pedals and cranking mechanism, in order to mount the seat member. Neither Snyder's limiting structure nor Mannesmann's lateral arms are suitable to stabilize a portable climbing device which must either rest on the ground or on nothing while a rider attempts to mount it because the object to be scaled is substantially taller than the frame of the device and lacks a face against which to support a pair of lateral arms.

It is the object of this invention to overcome the above-mentioned disadvantages and to provide a portable apparatus for establishing an elevated position to and from which an operator can easily raise and lower himself, respectively.

SUMMARY OF THE INVENTION

In accordance with the invention, a rotary winch is mounted on a V-shaped supporting member attached to a frame. The frame comprises at least one arcuate member which extends generally upwardly from its points of attachment to the V-shaped supporting member to a point above a seat member which is mounted on the concave side of the arcuate member proximate a set of foot pedals connected by cranking arms to gears which engage the winch so that a support cable can be alternately retracted and extended by pedaling. The shortest distance from the apex of the V-shaped supporting member to the arcuate member is greater than the diameters of the paths traversed by the pedals as they are rotated to retract the the support cable; and the lowermost point on each of these paths is disposed generally above this apex, so that a rider may mount the seat member and begin pedaling to raise himself while the apex of the V-shaped supporting member is resting on the ground.

The arcuate member is characterized as having a pair of end portions which form an opening which is substantially twice the radius of curvature of the arcuate member in width. Because the frame is confined to a narrow region of space which extends above, behind and beneath the seat member, a rider sitting thereon and facing the opening has a virtually unobstructed view in all directions.

In the preferred embodiment, the frame is substantially disposed along a semicircular arc and comprises two arcuate members such as a pair of plates having a plurality of guide elements attached thereto. These elements include rollers for guiding the support cable along the concave side of the frame. The lowermost roller is situated on a part of the concave side which is disposed generallly downwardly from the centers of curvature of the arcuate members so that when the cable is placed under tension, the cable acts on the rollers to stabilize the arcuate members by resisting forces which tend to increase the distance between the uppermost and the lowermost points on the arcuate members when a rider sits on the seat member. Alternately, the frame may comprise three arcuate members between which are secured spacers in each of which are mounted rollers to guide the cable.

The seat member preferably includes a pair of skids which straddle a section of each arcuate member and which can be positioned to and fro along the arcuate members to provide flexibility in the spacing between the foot pedals and the seat member.

Other features of the invention include a cable brake which is mounted on a section of the frame above the seat member so that a user has convenient access to this safety device by simply reaching over his head and can remain in an upright position at all times. The cable brake engages a drum, about which the support cable is wound, except when the brake is released, thereby protecting the cable from damage when a rider inadvertently alters the tension on the cable by pedaling when the brake is applied.

In accordance with a further aspect of the invention, the V-shaped supporting member is pivotally connected to the frame. The arm of this supporting member distal its pivotal joint can be passed through a space separating the two arcuate members of the frame to bring the apex of the supporting member proximate the convex side of the frame. In such a position, the pedals can then be rotated to retract the cable, thereby creating a more compact unit for storage and transport.

BRIEF DESCRIPTION OF THE DRAWINGS

Further details are explained below with the help of the examples illustrated in the attached drawings in which.

DESCRIPTION OF THE PREFERRED EMBODIMENTS

Figure 1:
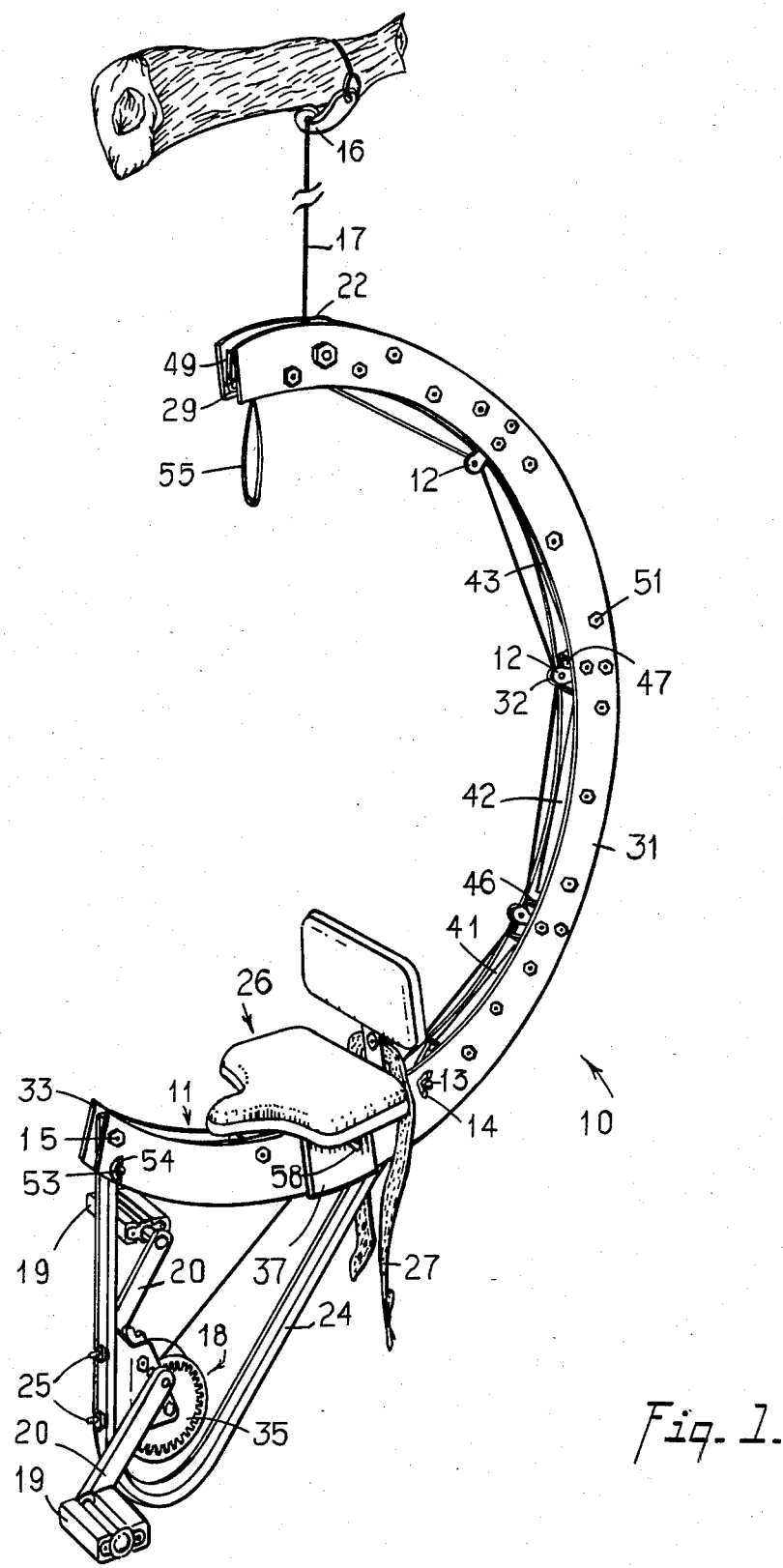
FIG. 1 is a perspective view of one embodiment of the present invention in which the portable climbing device is suspended from a tree limb.

Referring now to the drawings, a portable climbing device 10 according to the present invention includes a frame 11 having two arcuate members 31, 33 separated by spacers 41–49. The arcuate members 31, 33 are preferably formed of a durable, lightweight metal such as ¼ inch aluminum alloy plate and generally in the shape of a semicircle with the radius of curvature on the concave surface of each arcuate member being in the range 3½ to 5 feet. The spacers 41–49 which are formed of aluminum extrusion of rectangular cross-section or the like measure, by way of example, 1 inch by 2 inches. Each of the arcuate members, spacers, and guide elements 12 has holes formed therein for receiving the bolts 51, so that when the frame 11 is assembled, the arcuate members are arranged substantially parallel to each other. Alternately, the members 31, 33 may be rigidly connected to the spacers 41–49 by welding. In either embodiment, the frame 11 occupies only a narrow region of space which extends in a single band generally downwardly from a point above a seat member 26 and behind and beneath it when the frame is suspended in use. Moreover, the distance between the opposing edges of the upper and lower end portions 56, 57 of each arcuate member is preferably approximately 4½ feet, thereby insuring that a rider sitting on the seat member and facing the opening between these opposing sides has a virtually unobstructed view.

Figure 2:
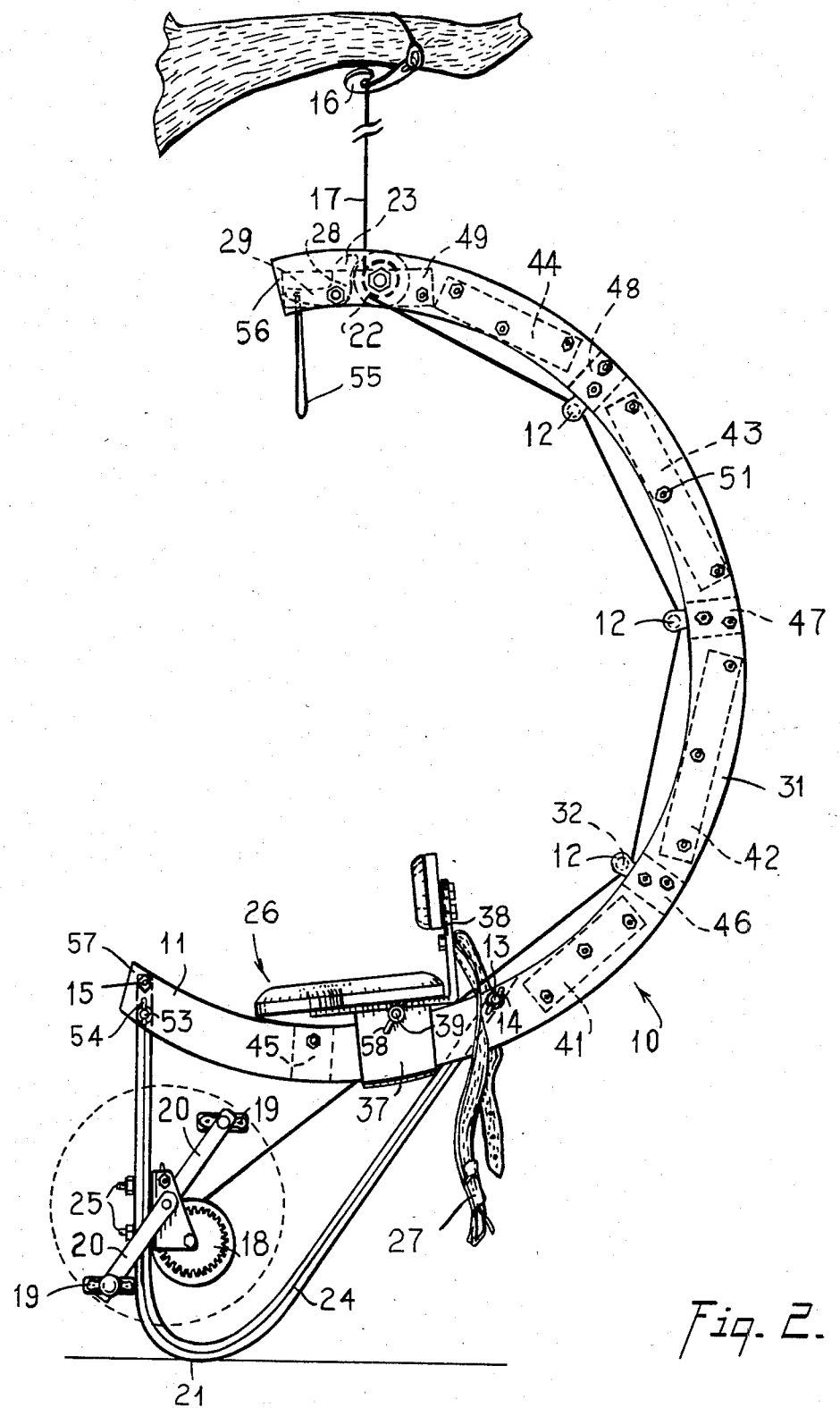
FIG. 2 is an elevational view of the same portable climbing device as in FIG. 1.

The portable climbing device 10 further comprises means for hoisting the frame 11 including a winch 18 with a support cable 17 attached thereto, the winch being fastened below the members 31, 33 to a V-shaped supporting member 24 by a pair of bolts 25. Pedals 19 attached to the cranking arms 20 of the winch 18 are provided so that a rider mounted astride the arcuate member 31, 33 can crank the pedals with his legs, thereby facilitating climbing. As is best illustrated in FIG. 2, the lowermost point on each of the paths traversed by the pedals 19 is disposed generally above the apex 21 of the V-shaped supporting member 24, so that a rider may mount the seat member and begin pedaling to actuate the hoisting means while the apex of the member 24 is resting on the ground. Alternately, because only the V-shaped supporting member contacts the earth first, a rider can hurriedly propel himself downwardly from an elevated position without fear of ramming the pedals and winch into the dirt. Further, with the apex of the member 24 resting on the ground, the user can dismount in a low, stable position.

Figure 3:
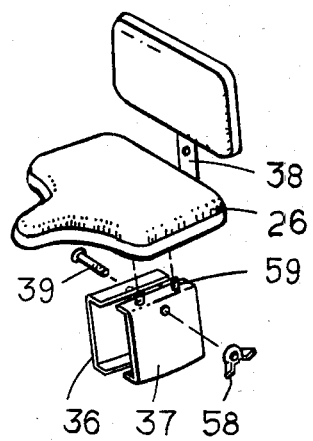
FIG. 3 is an exploded view showing in perspective the pair of skids supporting the seat member of the portable climbing device shown in FIG. 1.

In the example illustrated in FIGS. 1–3, the position of the seat member 26 can be adjusted to set the distance between the pedals and the seat member to that which is most comfortable for a particular user. Straddling the arcuate members 31, 33 are skids 36, 37 which are connected by pins 59 to an undercarriage 38 of the seat member 26 (FIGS. 1 and 3). The skids 36, 37 can be moved to and fro along the arcuate members 33, 31 by releasing a wing nut 58 on a tie arm 39 which is otherwise employed to clamp the skids against the arcuate members, thereby enabling a user to adjust the position of the seat member readily.

Prior to the use of the device 10 to climb an overhead structure such as a tree, a hook 16 which is attached to the support cable 17 is thrown or otherwise projected over a substantial limb of the tree and attached back to the cable (FIGS. 1 and 2). At the top of the device 10, the cable 17 passes between the arcuate members 31, 33 and is wound at least two times around the drum 22 of a cable brake 28. From the drum 22, the cable is guided across a plurality of rollers 32 mounted on the guide elements 12, each of which projects inwardly from one of the spacers 46–48 toward the centers of curvature of the arcuate members 31, 33. The rollers 32 are spaced apart so that the distances separating any two proximate pairs of rollers are substantially equal. The lowermost roller 32 protrudes from the concave side of the frame at a site which is disposed generally downwardly from the centers of curvature of the arcuate members 31, 33 so that when the cable 17 is placed under tension, the cable acts on the rollers 32 to stabilize the arcuate members by resisting forces which tend to increase the width of the opening between the opposing edges of the upper and lower end portions 56, 57 of each arcuate member when a rider sits on the seat member 26. With the cable 17 traveling along the frame 11 thusly, the combined weight of the frame, of its several attachments, and of a rider is distributed so that the seat 26 remains in an upright position at all times even when its position has been adjusted to and fro along the concave sides of the arcuate members 31, 33. A seat belt 27 is also provided with which the user may secure himself to the seat member.

The winch 18 has a spring loaded paw (not shown) that allows the winch drum 35 to rotate when the cable 17 which is attached thereto is being retracted during ascent but which must be released before a descent can take place. A preferred winch, but obviously not the only one, is the model 800 manufactured by Dutton Lainson Co. of Hastings, Nebr.

In addition to the safety stop found on the winch 18, the portable climbing device 10 includes a cable brake 28 mounted on the frame 11 along the path of the cable 17 in a position which is easily accessible to the user. In the preferred embodiment shown in FIGS. 1 and 2, the cable brake 28 is mounted on the frame 11 above the seat member 26 for ready access. The brake 28 comprises a brake shoe 23 which engages the drum 22 except when the brake shoe is released by pulling downwardly on the lever arm 29 (FIG. 2). To release the brake, the user simply pulls the strap 55. The cable then passes upwardly and about the freely rotating drum, thereby allowing the rider to raise or to lower himself by turning the pedals 19. With the brake shoe acting on the drum, the cable is protected from forces which might otherwise tend to fray it were a rider inadvertently to alter the tension on the cable by pedaling when the brake was applied.

Figure 4:
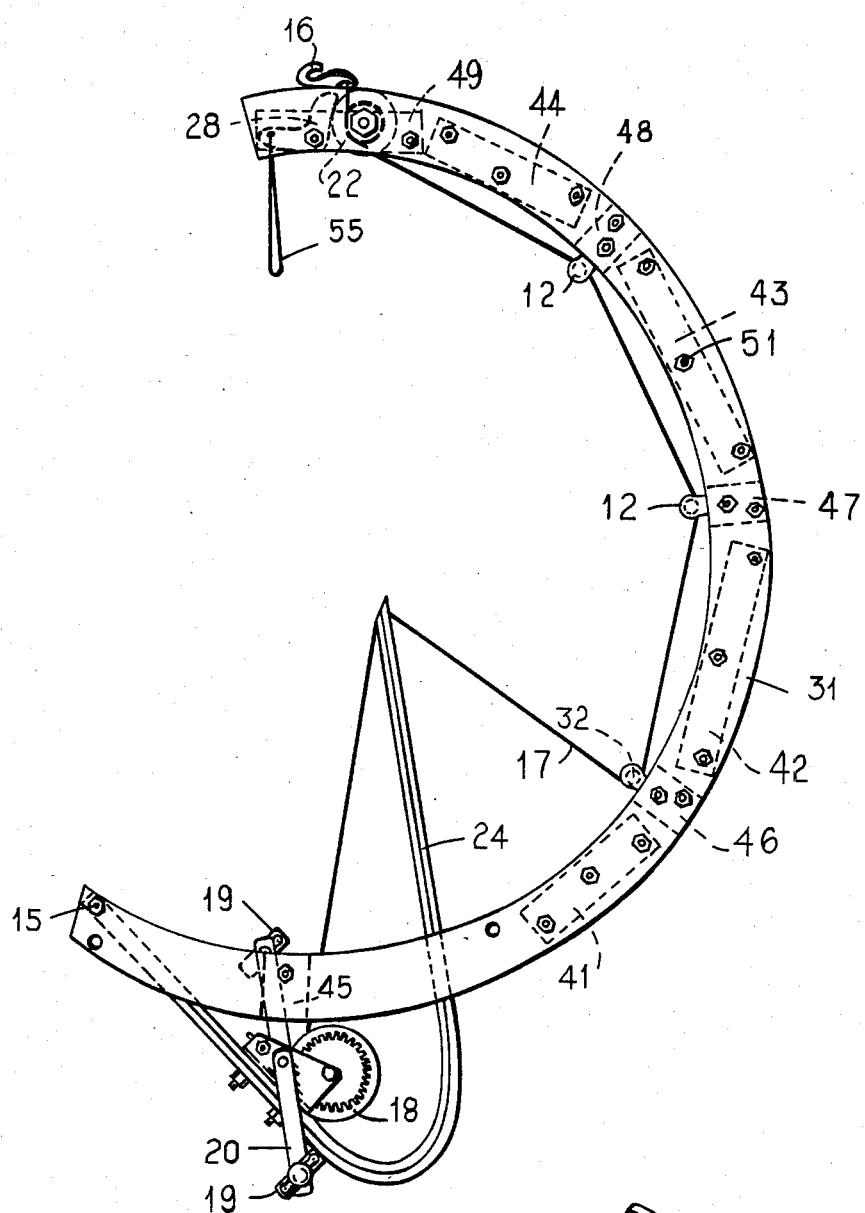
FIG. 4 is an elevational view of the frame of the same portable climbing device as in FIG. 1 in which the V-shaped supporting member has been rotated about its pivotal joint with the remainder of the frame.

As is also illustrated in FIGS. 1 and 2, a bolt 15, pins 13, 53 and wing nuts 14, 54 are preferably employed to secure the two arms of the V-shaped supporting member 24 to the frame 11. The removal of the pins 13, 53 allows the member 24 to be rotated about the bolt 15 to bring the apex of the member 24 proximate the convex side of the frame and thereby collapse the device 10 for ease of storage and transportability (FIG. 4).

MODIFICATION

The portable climbing device can be altered in various ways within the basic concept of the invention. In particular, it possible to have a frame comprising three arcuate members. In the preferred embodiment illustrated in FIG. 5, a portable climbing device 60 includes a frame 61 having a pair of arcuate members 71, 72 which are disposed on the concave side of a third arcuate member 73 and separated from each other by spacers 76–81. Alternately, the pair of arcuate members may be disposed on the convex side of the third arcuate member.

The arcuate members 71–73 are preferably formed of a durable, lightweight metal such as 1 inch diameter, thin wall, high strength steel tubing and are arranged substantially parallel to each other with the inner pair of arcuate members 71, 72 being disposed on either side of a plane which bisects the third arcuate member longitudinally when the frame 61 is suspended in use. Alternately, the arcuate member 73 may be fabricated from a ⅜ inch steel rod. In either embodiment, the spacers 76–81 are preferably formed of steel tubing measuring, by way of example, 3 inches in diameter. The members 71–73 are rigidly connected to the spacers by welding.

Figure 5:
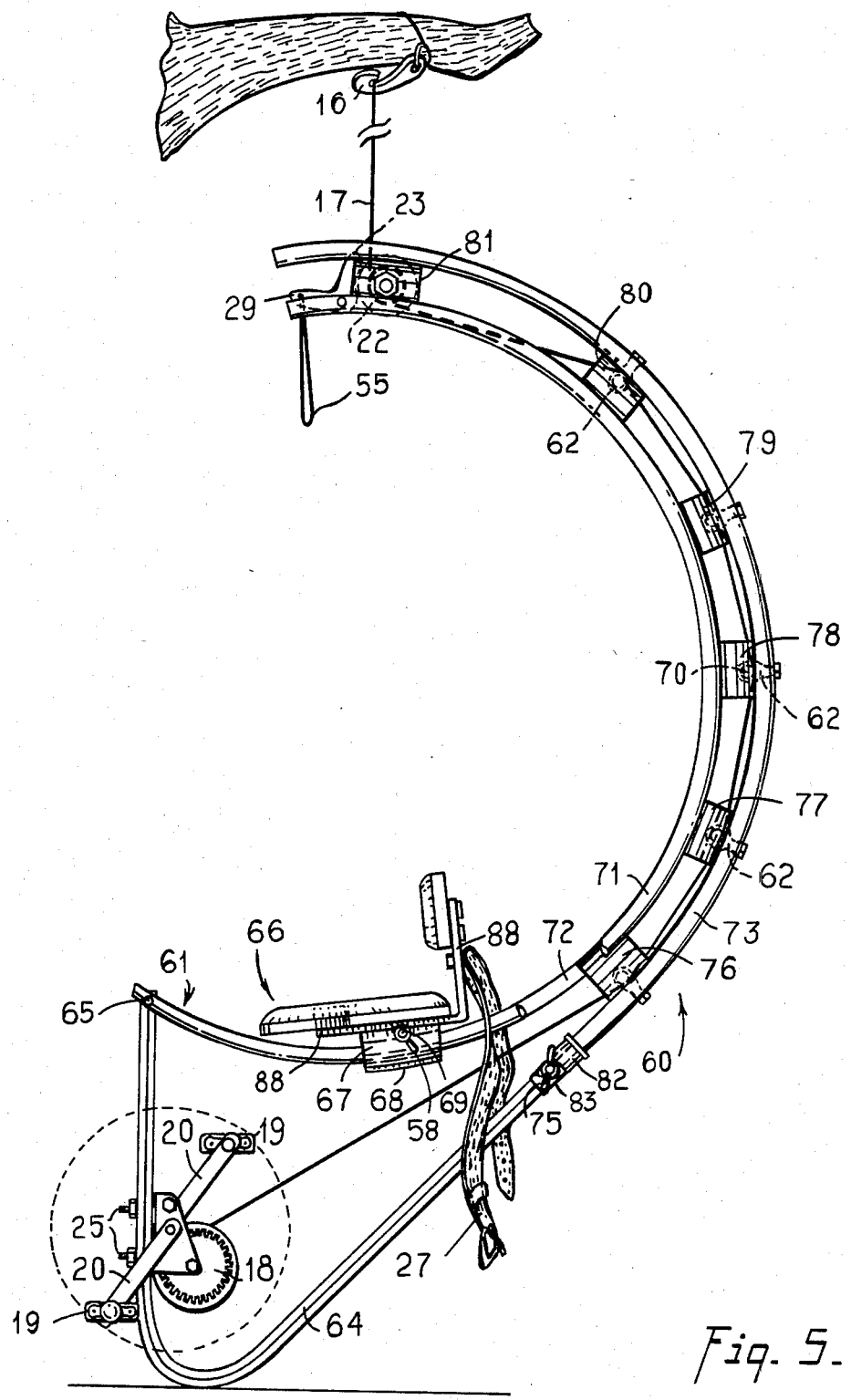
FIG. 5 is an elevational view showing an alternate embodiment of the present invention with a broken out section showing the second arcuate member on the concave side of the frame.

In the embodiment shown in FIG. 5, the cable 17 is guided across a plurality of rollers 70, each of which is mounted on a guide element 62 within one of the spacers 76–80. Above the lowermost roller in the spacer 76, the arcuate members 71–73 function as protective barriers to the cable on the concave and convex sides, respectively, of the frame 61.

Further, in the portable climbing device 60, a pair of skids 67, 68 which are slideably connected to the undercarriage 88 of a seat member 66 straddle the inner pair of arcuate members 71, 72. The skids 67, 68 can be moved to and fro along the arcuate members 71, 72 by releasing a tie arm 69. Each skid 67, 68 includes a lower section with a concave surface to facilitate clamping the skids against the convex surfaces of the arcuate members 71, 72, respectively.

The device 60 further comprises a V-shaped supporting member 64, one arm of which is hinged to a pin 65 connecting the lower end portions of the members 71, 72 (FIG. 5). The other arm of the member 64 is capped by a bifurcated member 83 rigidly attached thereto. A tube bracket 82 is joined to the lower end of the arcuate member 73. The bracket 82 and the forks of the bifurcated member 83 each have a hole formed therein for receivng a pin 74. The pin 74 and a wing nut 75 hold the bracket 82 and the bifurcated member 83 in assembled relation. So assembled, any loads on the outermost arcuate member 73 are transmitted along the V-shaped supporting member 64 as well, thereby stabilizing the frame 61. The removal of the pin 74 allows the V-shaped supporting member 64 to be rotated about the pin 65 to bring the apex of the member 64 proximate the convex side of the frame in order to facilitate the storage and transport of the device 60.

Although I have shown and described certain specific embodiments of my invention, I am well aware that many modifications thereof are possible.

What is claimed is:

1. A portable climbing device which is adapted to be hung from an existing overhead structure such as a tree limb, comprising:
    (a) a frame having at least one arcuate member; the arcuate member being generally bisected in a longitudinal direction;
    (b) a seat member mounted on the arcuate member and extending generally upwardly toward the center of curvature thereof; the arcuate member having a pair of end portions defining an opening, the arcuate member occupying a narrow region of space which extends generally downwardly from the upper end portion and above, behind and beneath the seat member when the frame is suspended in use;
    (c) a supporting member, each arm of which is connected to the arcuate member to form a structure proximate the seat member; said structure extending away from the center of curvature of the arcuate member;
    (d) means for hoisting the frame including a winch mounted on the supporting member, a set of foot pedals rotatably connected thereto, a support cable attached to the winch, and means connected to the foot pedals for engaging the winch so that the cable can be alternately retracted and extended by pedaling; and
    (e) a pair of skids for detachably mounting the seat member on the arcuate member, the skids straddling a section of the arcuate member having a side with a concave surface which extends outwardly between the pair of skids, and means for adjusting the positions of the skids to and fro along said section; the seat member remaining in a generally upright position when the frame is suspended in use; the distance between the uppermost portion of the seat member and said concave surface remaining approximately constant as the positions of the skids are adjusted, so that as the spacing between the foot pedals and the seat member is increased, there is an increase in the amount of space free of obstacles above the seat member as indicated by an increase in the angle between two imaginary lines extending from the center of the uppermost portion of the seat member, one of these lines joining said center to said upper end portion of the arcuate member and the other of these lines extending downwardly from said center perpendicularly to said concave surface.

2. A portable climbing device according to claim 1 wherein the frame further comprises a plurality of rollers for guiding the support cable, each of the rollers being mounted proximate the concave side of the arcuate member and spaced apart, the lowermost roller being situated on a part of the concave side which is disposed generally downwardly from the center of curvature of the arcuate member, so that when the cable is placed under tension, the cable acts on the rollers to stablize the arcuate member by resisting forces which tend to increase the width of said opening when a rider sits on the seat member.

3. A portable climbing device according to claim 1 which further comprises a cable brake including a drum about which the support cable is wound, the brake being mounted on the frame proximate the upper end portion of the arcuate member, so that a rider has easy access to the cable brake but is not likely to release it inadvertently; the cable brake engaging the drum except when the brake is released, thereby preventing damage to the cable when a rider inadvertently alters the tension on the cable by pedalling when the brake is applied.

4. A portable climbing device which is adapted to be hung from an existing overhead structure such as a tree limb, comprising:
  (a) a frame having at least one arcuate member; the arcuate member being generally bisected in a longitudinal direction by a vertical plane when the frame is suspended in use;
  (b) a seat member mounted on the arcuate member and extending generallly upwardly toward the center of curvature thereof;
  (c) a V-shaped supporting member; means for hoisting the frame including a winch mounted on the V-shaped supporting member, a set of foot pedals rotatably connected thereto, a support cable attached to the winch, and means connected to the foot pedals for engaging the winch so that the cable can be alternately retracted and extended by pedaling; the shortest distance from the apex of said V-shaped supporting member to the arcuate member being greater than the diameters of the paths traversed by the pedals as they are rotated to retract the support cable, the lowermost point on each of said paths being disposed generally upwardly from said apex, so that a rider may mount the seat member and begin pedaling to actuate the hoisting means while the apex of the V-shaped supporting member is resting on the ground; and
  (d) each arm of the V-shaped supporting member being connected to the arcuate member to form a three-sided structure proximate the seat member; said structure extending away from the center of curvature of the arcuate member; one of the connections between the arcuate member and an arm of the V-shaped supporting member being a pivotal joint and the arm of the supporting member distal said joint being detachably connected to the arcuate member, so that the V-shaped supporting member can be rotated about said pivotal joint to bring the apex of the supporting member proximate the convex side of the arcuate member and the pedals can be subsequently rotated to retract the cable, thereby facilitating the storage and transport of the device.

5. A portable climbing device which is adapted to be hung from an existing overhead structure such as a tree limb, comprising:
  (a) a frame having at least three arcuate members having substantially identical radii of curvature and being spaced apart and arranged substantially parallel to each other, an inner pair of the arcuate members being disposed generally radially of the third arcuate member and either side of a plane which bisects the third arcuate member longitudinally when the frame is suspended in use; each of the arcuate members having a pair of end portions; the upper and lower end portions of said pair of arcuate members being disposed proximate each other, respectively, and defining an opening;
  (b) a supporting member having at least two arms, each arm of which is connected to at least one of the arcuate members; said structure extending away from the centers of curvature of the arcuate members;
  (c) means for hoisting the frame including a winch mounted on the supporting member and a support cable attached to the winch, so that the cable can be alternately retracted and extended; and
  (d) a seat member mounted on sections of said pair of arcuate members proximate the supporting member; the seat member extending generally toward the centers of curvature of the arcuate members; the frame occupying a narrow region of space which extends generally downwardly from a point above the seat member and behind and beneath it when the frame is suspended in use; the seat member having a pair of skids for detachably mounting it on the arcuate members, the skids straddling sections of the inner pair which are proximate the lower end portions thereof and which have concave surfaces which extend outwardly between the pair of skids, and means for adjusting the positions of the skids to and fro along said sections; the distance between the uppermost portion of the seat member and said concave surfaces remaining approximately constant as the positions of the skids are adjusted, so that as the seat member is moved away from said lower end portions, there is an increase in the amount of space free of obstacles contributed by the device itself above the seat member.

6. A portable climbing device according to claim 5 wherein the hoisting means further comprises a set of foot pedals rotatably connected to the winch so that the cable can be alternately retracted and extended by pedaling, wherein the supporting member is further characterized as being V-shaped and wherein the shortest distance from the apex of the V-shaped supporting member to the third arcuate member is greater than the diameters of the paths traversed by the pedals as they are rotated to retract the cable, the lowermost point on each of said paths being disposed generally upwardly from said apex, so that a rider may mount the seat member and being pedaling to actuate the hoisting means while the apex of the V-shaped supporting member is resting on the ground.

7. A portable climbing device according to claim 5 wherein the frame further comprises a plurality of spacers and of rollers for guiding the support cable, the concave side of the third arcuate member being attached to the outside surface of each of the spacers, each of the rollers being mounted within one of the spacers, so that the rollers are shielded by the spacers and said pair of arcuate members and the third arcuate member function as protective barriers for the cable on the concave and convex sides, respectively, of the frame above the lowermost roller.

8. A portable climbing device according to claim 5 wherein one of the connections between an arcuate member and a first arm of the supporting member is further characterized as being a hinged joint and wherein a second arm of the supporting member distal said joint is further characterized as being detachably connected to the third arcuate member, the end section of the detachably connected arm passing between said pair of arcuate members when the supporting member is rotated about said hinged joint to bring the apex of the supporting member proximate the convex side of the frame, thereby facilitating the storage and transport of the device.

9. A portable climbing device which is adapted to be hung from an existing overhead structure such as a tree limb, comprising:
   (a) a frame having at least three arcuate members having substantially identical radii of curvature and being spaced apart and arranged substantially parallel to each other, a pair of the arcuate members being disposed generally radially of the third arcuate member and on either side of a plane which bisects the third arcuate member longitudinally when the frame is suspended in use; each of the arcuate members having a pair of upper and lower end portions; the upper and lower end portions of said pair being disposed proximate each other, respectively, and defining an opening;
   (b) a V-shaped supporting member, each arm of which is connected to at least one of the arcuate members to form a three-sided structure; said structure extending away from the centers of curvature of the arcuate members;
   (c) means for hoisting the frame including a winch mounted on the V-shaped supporting member, a set of foot pedals rotatably connected thereto, a support cable attached to the winch, and means connected to the foot pedals for engaging the winch so that the cable can be alternately retracted and extended by pedaling;
   (d) a seat member mounted on sections of said pair of arcuate members proximate the V-shaped supporting member; the seat member extending generally toward the centers of curvature of the arcuate members; the frame occupying a narrow region of space which extends generally downwardly from a point above the seat member and behind and beneath it when the frame is suspended in use, so that a rider sitting on the seat member and facing the opening has a virtually unobstructed view; and
   (e) one of the connections between an arcuate member and an arm of the V-shaped supporting member being a hinged joint and the arm of the supporting member distal said joint being detachably connected to the third arcuate member, the end section of the detachably connected arm passing between said pair of arcuate members when the V-shaped supporting member is rotated about said hinged joint to bring the apex of the supporting member proximate the convex side of the frame, thereby facilitating the storage and transport of the device.

* * * * *